(12) United States Patent
Yasuyama et al.

(10) Patent No.: US 12,724,418 B2
(45) Date of Patent: Sep. 1, 2026

(54) REMOTE CONTROL DISABLING DEVICE, MOVING OBJECT, AND REMOTE CONTROL DISABLING METHOD

(71) Applicant: TOYOTA JIDOSHA KABUSHIKI KAISHA, Toyota (JP)

(72) Inventors: Shogo Yasuyama, Okazaki (JP); Kento Iwahori, Nagoya (JP); Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 18/738,783

(22) Filed: Jun. 10, 2024

(65) Prior Publication Data

US 2024/0419178 A1 Dec. 19, 2024

(30) Foreign Application Priority Data

Jun. 16, 2023 (JP) ................................ 2023-098866

(51) Int. Cl.
*G05D 1/227* (2024.01)
*G05D 1/65* (2024.01)
*G05D 107/70* (2024.01)
*G05D 109/10* (2024.01)

(52) U.S. Cl.
CPC ............... *G05D 1/227* (2024.01); *G05D 1/65* (2024.01); *G05D 2107/70* (2024.01); *G05D 2109/10* (2024.01)

(58) Field of Classification Search
None
See application file for complete search history.

(56) References Cited

U.S. PATENT DOCUMENTS

2008/0048844 A1 2/2008 Watanabe et al.
2017/0320529 A1 11/2017 Nordbruch
2018/0339703 A1* 11/2018 Nix ...................... G05D 1/0282
2021/0024099 A1 1/2021 Ito et al.
2021/0331710 A1 10/2021 Moriya et al.
2022/0019218 A1 1/2022 Tamori et al.

FOREIGN PATENT DOCUMENTS

JP 2006-092130 A 4/2006
JP 2017-538619 A 12/2017
JP 2021-17214 A 2/2021
JP 2021-062790 A 4/2021
JP 2022-028093 A 2/2022

* cited by examiner

*Primary Examiner* — Christopher A Buksa
(74) *Attorney, Agent, or Firm* — Oliff PLC

(57) ABSTRACT

A remote control disabling device includes: a determination unit that determines part of functions that are targets to be switched between an enabled state and a disabled state among a plurality of functions of a moving object to be executed by remote control; and a transmission unit that transmits a signal for causing the moving object to switch between the enabled state and the disabled state of the part of the functions.

14 Claims, 10 Drawing Sheets

10
100
400
300
PROCESS MANAGEMENT DEVICE
205
COMMUNICATION DEVICE
200
203
INPUT/OUTPUT INTERFACE
204
201
202
PROCESSOR
INFORMATION ACQUISITION UNIT
210
DISABLING TARGET FUNCTION DETERMINATION UNIT
220
DISABLING SIGNAL GENERATION UNIT
230
DISABLING SIGNAL TRANSMISSION UNIT
240
MEMORY
PROGRAM
PG2
DATABASE
DB 200
300
400
CM
CM
CM
CM
CM
100A
100B
100C
100D
100E
PL1
PL2
PL3
SR
SR
KJ

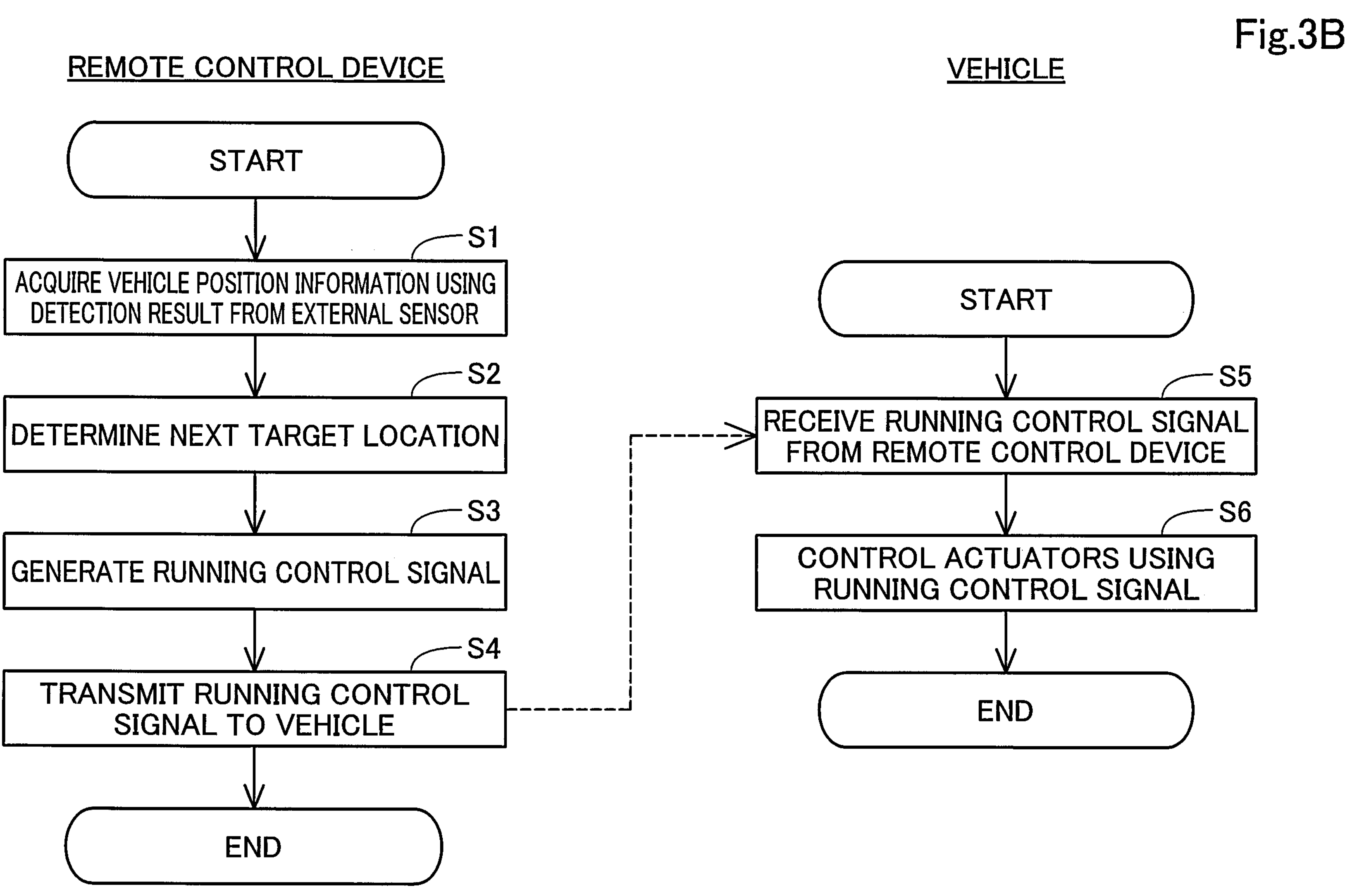
Fig.3B
REMOTE CONTROL DEVICE
START
S1
ACQUIRE VEHICLE POSITION INFORMATION USING DETECTION RESULT FROM EXTERNAL SENSOR
S2
DETERMINE NEXT TARGET LOCATION
S3
GENERATE RUNNING CONTROL SIGNAL
S4
TRANSMIT RUNNING CONTROL SIGNAL TO VEHICLE
END
VEHICLE
START
S5
RECEIVE RUNNING CONTROL SIGNAL FROM REMOTE CONTROL DEVICE
S6
CONTROL ACTUATORS USING RUNNING CONTROL SIGNAL
END

| FUNCTION A | ENABLE→DISABLE |
|---|---|
| FUNCTION B | ENABLE |
| FUNCTION C | ENABLE→DISABLE |
| FUNCTION D | ENABLE |

SECOND EMBODIMENT

REMOTE CONTROL DISABLING DEVICE, MOVING OBJECT, AND REMOTE CONTROL DISABLING METHOD

CROSS REFERENCE TO RELATED APPLICATIONS

This application claims priority to Japanese Patent Application No. 2023-098866, filed Jun. 16, 2023, the disclosure of which is incorporated by reference herein in its entirety.

BACKGROUND

Field

The present disclosure relates to a remote control disabling device, a moving object, and a remote control disabling method.

There is known a technique of causing a vehicle to run by remote control in a vehicle manufacturing process (for example, Japanese Patent Application Publication (Translation of PCT Application) No. 2017-538619).

To prevent a third party from remotely controlling a moving object such as a vehicle, it is preferable to disable remote control functions of the moving object when the moving object is shipped from a factory. However, when all remote control functions are disabled, user-friendliness is likely to deteriorate.

SUMMARY

The present disclosure can be implemented as following aspects.

(1) A first aspect according to the present disclosure provides a remote control disabling device. This remote control disabling device includes: a determination unit configured to determine part of functions that are targets to be switched between an enabled state and a disabled state among a plurality of functions of a moving object to be executed by remote control; and a transmission unit configured to transmit a signal for causing the moving object to switch between the enabled state and the disabled state of the part of the functions.

The remote control disabling device according to this aspect does not switch between the enabled state and the disabled state of all of functions to be executed by remote control, but can switch between the enabled state and the disabled state of part of functions to be executed by remote control, so that it is possible to prevent user-friendliness from deteriorating.

(2) In the remote control disabling device according to the above aspect, the moving object may be remotely controlled in a factory that manufactures the moving object, and the determination unit may determine the part of the functions according to a progress of a manufacturing process of the moving object.

According to the progress of the manufacturing process of the moving object, the remote control disabling device according to this aspect can switch between the enabled state and the disabled state of part of the functions to be executed by remote control, so that it is possible to prevent user-friendliness from deteriorating.

(3) In the remote control disabling device according to the above aspect, the moving object may be a vehicle, and when the moving object is in a shipping standby state from the factory, the transmission unit may transmit the signal for switching between an enabled state and a disabled state of a function of changing a shift position of the moving object.

The remote control disabling device according to this aspect can prevent the third party from changing the shift position by remote control after shipping.

(4) In the remote control disabling device according to the above aspect, the part of the functions may include a function of accelerating the moving object and a function of decelerating the moving object.

The remote control disabling device according to this aspect can prevent the third party from accelerating and decelerating the moving object by remote control.

(5) In the remote control disabling device according to the above aspect, the part of the functions may include a function of changing a traveling direction of the moving object.

The remote control disabling device according to this aspect can prevent the third party from changing the traveling direction of the moving object by remote control.

(6) In the remote control disabling device according to the above aspect, the part of the functions may include a function of moving at over a predetermined speed.

The remote control disabling device according to this aspect can prevent the third party from moving the moving object at over the predetermined speed by remote control.

(7) In the remote control disabling device according to the above aspect, the plurality of functions may include a first function and a second function different from the first function, and the determination unit may determine the first function as the part of the functions when a predetermined first condition is satisfied, and determine the second function as the part of the functions when a predetermined second condition different from the first condition is satisfied.

The remote control disabling device according to this aspect can vary the function that is switched between the enabled state and the disabled state according to the condition.

(8) A second aspect according to the present disclosure provides a moving object that can be moved by remote control. This moving object includes: an acquisition unit configured to acquire information indicating part of functions that are targets to be switched between an enabled state and a disabled state among a plurality of functions of the moving object to be executed by remote control; and an execution unit configured to switch between the enabled state and the disabled state of the part of the functions using the information.

The moving object according to this aspect does not switch between the enabled state and the disabled state of all of functions to be executed by remote control, but can switch between the enabled state and the disabled state of part of functions to be executed by remote control, so that it is possible to prevent user-friendliness from deteriorating.

(9) A third aspect according to the present disclosure provides a remote control disabling method. This remote control disabling method includes: determining part of functions that are targets to be switched between an enabled state and a disabled state among a plurality of functions of a moving object to be executed by remote control; and causing the moving object to switch between the enabled state and the disabled state of the part of the functions.

The remote control disabling method according to this aspect does not switch between the enabled state and the disabled state of all of functions to be executed by remote control, but can switch between the enabled state and the disabled state of part of functions to be executed by remote control, so that it is possible to prevent user-friendliness from deteriorating.

The present disclosure can be implemented as various aspects other than the remote control disabling device, the moving object, and the remote control disabling method. The present disclosure can be implemented as, for example, a remote control disabling system, a remote control disabling method, a vehicle, a computer program, and a recording medium having the computer program recorded thereon.

BRIEF DESCRIPTION OF DRAWINGS

FIG. 3B is a flowchart illustrating a procedure of running control of the vehicle according to the first embodiment;

FIG. 6 is an explanatory view illustrating how part of remote control functions of the vehicle are disabled;

DETAILED DESCRIPTION

A. First Embodiment

Figure 1:
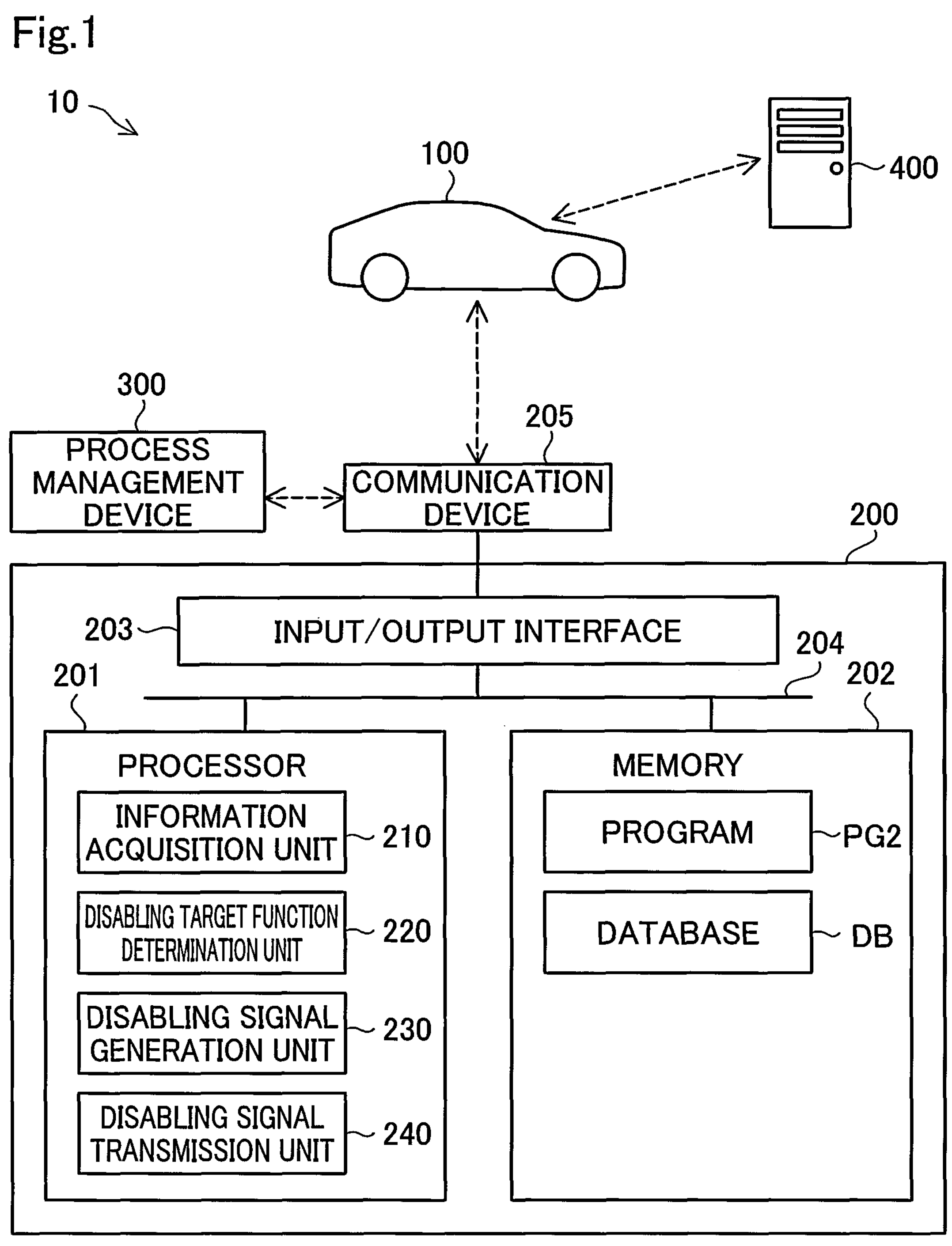
FIG. 1 is an explanatory view illustrating a configuration of a remote control disabling system according to a first embodiment.
Figure 2:
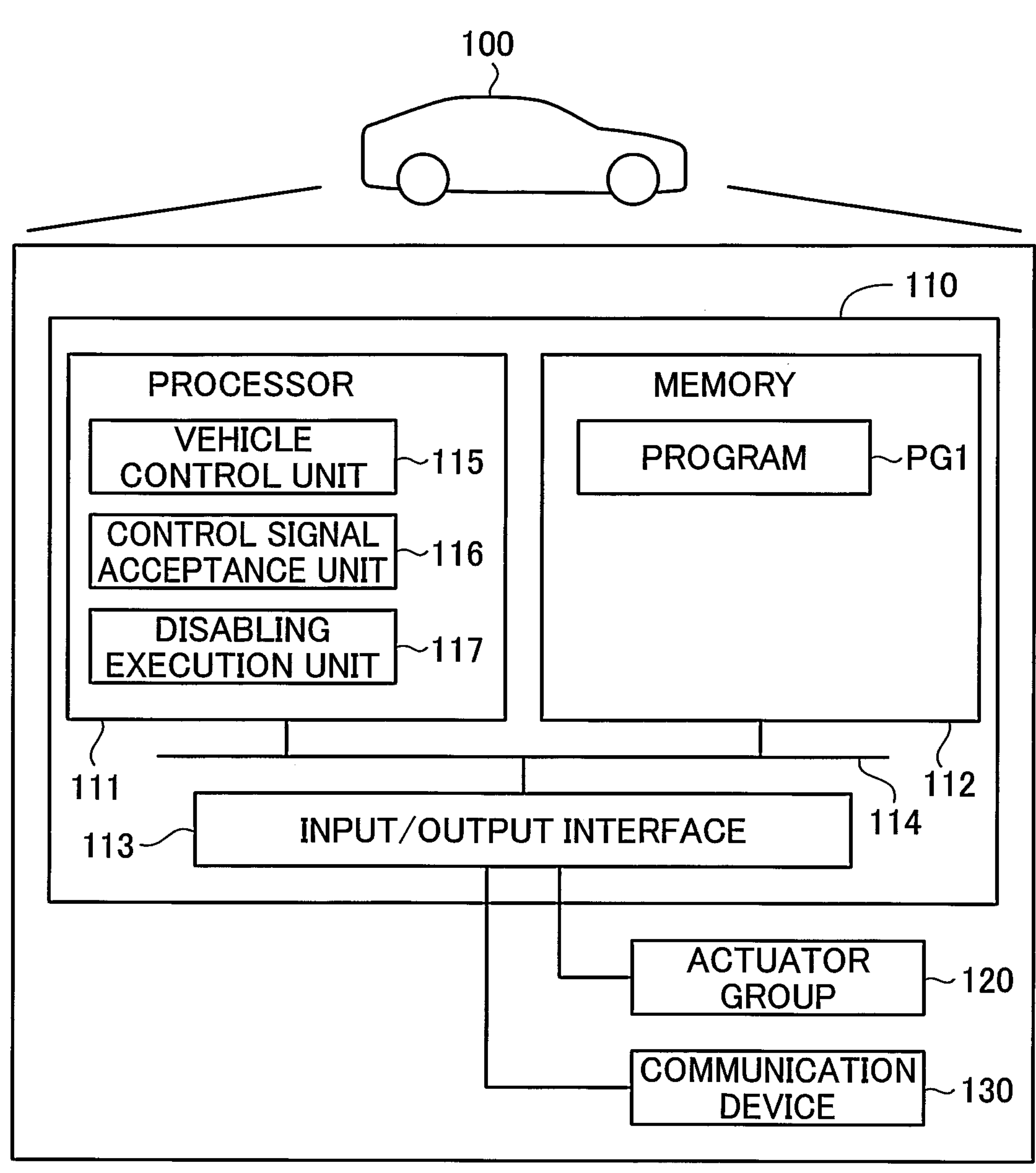
FIG. 2 is an explanatory view illustrating a configuration of a vehicle according to the first embodiment.

FIG. 1 is an explanatory view illustrating a configuration of a remote control disabling system 10 according to the first embodiment. FIG. 2 is an explanatory view illustrating a configuration of a vehicle 100 according to the first embodiment. The remote control disabling system 10 is used to disable remote control functions of the a moving object.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As illustrated in FIG. 1, the remote control disabling system 10 includes the vehicle 100 that can be operated by remote control, a remote control disabling device 200, and a process management device 300 in the present embodiment. The remote control disabling device 200 and the process management device 300 are disposed in a factory that manufactures the vehicle 100. Furthermore, a remote control device 400 for remotely controlling the vehicle 100 is disposed in the factory. In the present disclosure, functions executed by the vehicle 100 when the vehicle 100 is remotely controlled from an outside will be referred to as remote control functions.

As illustrated in FIG. 2, the vehicle 100 includes a vehicle control device 110 that controls each unit of the vehicle 100, an actuator group 120 that is driven under control of the vehicle control device 110, and a communication device 130 for communicating with the remote control disabling device 200 and the remote control device 400 by wireless communication. The actuator group 120 includes at least one actuator. In the present embodiment, the actuator group 120 includes an actuator of a driving device that accelerates the vehicle 100, an actuator of a steering device that changes a traveling direction of the vehicle 100, and an actuator of a braking device that decelerates the vehicle 100. The driving device includes a battery, a running motor that is driven using power of the battery, and driving wheels that are rotated by a running motor. The actuator of the driving device includes the running motor. Note that the actuator group 120 may further include, for example, an actuator that causes a horn of the vehicle 100 to honk, an actuator that switches between a light-on state and a light-out state of a lighting device of the vehicle 100, and the like.

The vehicle control device 110 is configured as a computer that includes a processor 111, a memory 112, an input/output interface 113, and an internal bus 114. The processor 111, the memory 112, and the input/output interface 113 are bidirectionally communicably connected via the internal bus 114. The input/output interface 113 is connected with the actuator group 120 and the communication device 130.

The processor 111 functions as a vehicle control unit 115, a control signal acceptance unit 116, and a disabling execution unit 117 by executing a computer program PG1 stored in advance in the memory 112. The vehicle control unit 115 controls the actuator group 120. The control signal acceptance unit 116 accepts a control signal SS transmitted from the remote control device 400 for remotely controlling the vehicle 100. In the present embodiment, the vehicle control unit 115 can cause the vehicle 100 to operate by controlling the actuator group 120 according to a driver's operation when the driver is in the vehicle 100. The vehicle control unit 115 can cause the vehicle 100 to operate by controlling the actuator group 120 in response to the control signal SS accepted from the control signal acceptance unit 116, in other words, by the remote control function irrespectively of whether or not the driver is in the vehicle 100.

In the present embodiment, the vehicle 100 includes a plurality of remote control functions. The remote control functions include, for example, following functions.

A function of accelerating the vehicle 100. In other words, a function of driving the actuator of the driving device.

A function of decelerating the vehicle 100. In other words, a function of driving the actuator of the braking device.

A function of changing the traveling direction of the vehicle 100. In other words, a function of driving the actuator of the steering device.

A function of causing the vehicle 100 to run at a speed over a predetermined speed.

A function of switching the state of the vehicle 100 between "Ready-OFF" and "Ready-ON". Note that "Ready-OFF" is a state corresponding to ignition OFF of a gasoline car, and "Ready-ON" is a state corresponding to ignition ON in the gasoline car.

A function of changing a shift position of the vehicle 100.

A function of causing the horn of the vehicle 100 to honk.

A function of switching between the light-on state and the light-out state of the lighting device of the vehicle 100.

The disabling execution unit 117 detects a disabling signal MS transmitted from the remote control disabling device 200, and disables part of the remote control functions of the vehicle 100 according to the detected disabling signal MS. In the present embodiment, the disabling signal MS includes information indicating disabling target functions among the plurality of remote control functions of the vehicle 100. The disabling execution unit 117 disables part of the remote control functions by stopping acceptance of the control signal SS at the control signal acceptance unit 116 related to the disabling target functions. In the present embodiment, the disabling execution unit 117 irreversibly disables the remote control functions. Reversibly disabling the remote control functions means disabling the remote control functions such that the remote control functions can be enabled again, and irreversibly disabling the remote control functions means disabling the remote control functions such that the remote control functions cannot be enabled again. When reversibly disabling remote control, the disabling execution unit 117 may make the remote control unusable as long as whether or not an authority to enable the remote control is obtained is cleared. The disabling execution unit 117 may irreversibly disable the remote control by, for example, deleting a portion related to remote control from the computer program PG1 stored in the memory 112. In a case where a relay that is irreversibly opened or closed is provided between the vehicle control device 110 and the communication device 130, the disabling execution unit 117 may irreversibly disable the remote control by opening or closing the relay and blocking connection between the vehicle control device 110 and the communication device 130. The disabling execution unit 117 may irreversibly disable the remote control by burning a circuit with a current.

As illustrated in FIG. 1, the remote control disabling device 200 is configured as a computer that includes a processor 201, a memory 202, an input/output interface 203, and an internal bus 204. The processor 201, the memory 202, and the input/output interface 203 are bidirectionally communicably connected via the internal bus 204. The input/output interface 203 is connected with a communication device 205 that communicates with the vehicle 100 by wireless communication.

The processor 201 functions as an information acquisition unit 210, a disabling target function determination unit 220, a disabling signal generation unit 230, and a disabling signal transmission unit 240 by executing a computer program PG2 stored in advance in the memory 202. The information acquisition unit 210 acquires information related to a progress of the manufacturing process of the vehicle 100 from the process management device 300. The disabling target function determination unit 220 determines target functions to disable among the plurality of remote control functions of the vehicle 100. The disabling signal generation unit 230 generates the disabling signal MS for disabling the remote control functions determined by the disabling target function determination unit 220. The disabling signal transmission unit 240 transmits to the vehicle 100 the disabling signal MS generated by the disabling signal generation unit 230. Note that the disabling target function determination unit 220 will be referred to simply as a determination unit, the disabling signal generation unit 230 will be referred to simply as a generation unit, and the disabling signal transmission unit 240 will be referred to simply as a transmission unit.

The process management device 300 manages the entire manufacturing process of the vehicle 100 in the factory. The process management device 300 manages, for example, the progress of the manufacturing process of the vehicle 100. The process management device 300 includes at least one computer. The process management device 300 includes an unillustrated communication device, and can communicate with the remote control disabling device 200, the remote control device 400, and various facilities of the factory by wired communication or wireless communication.

Figure 3A:
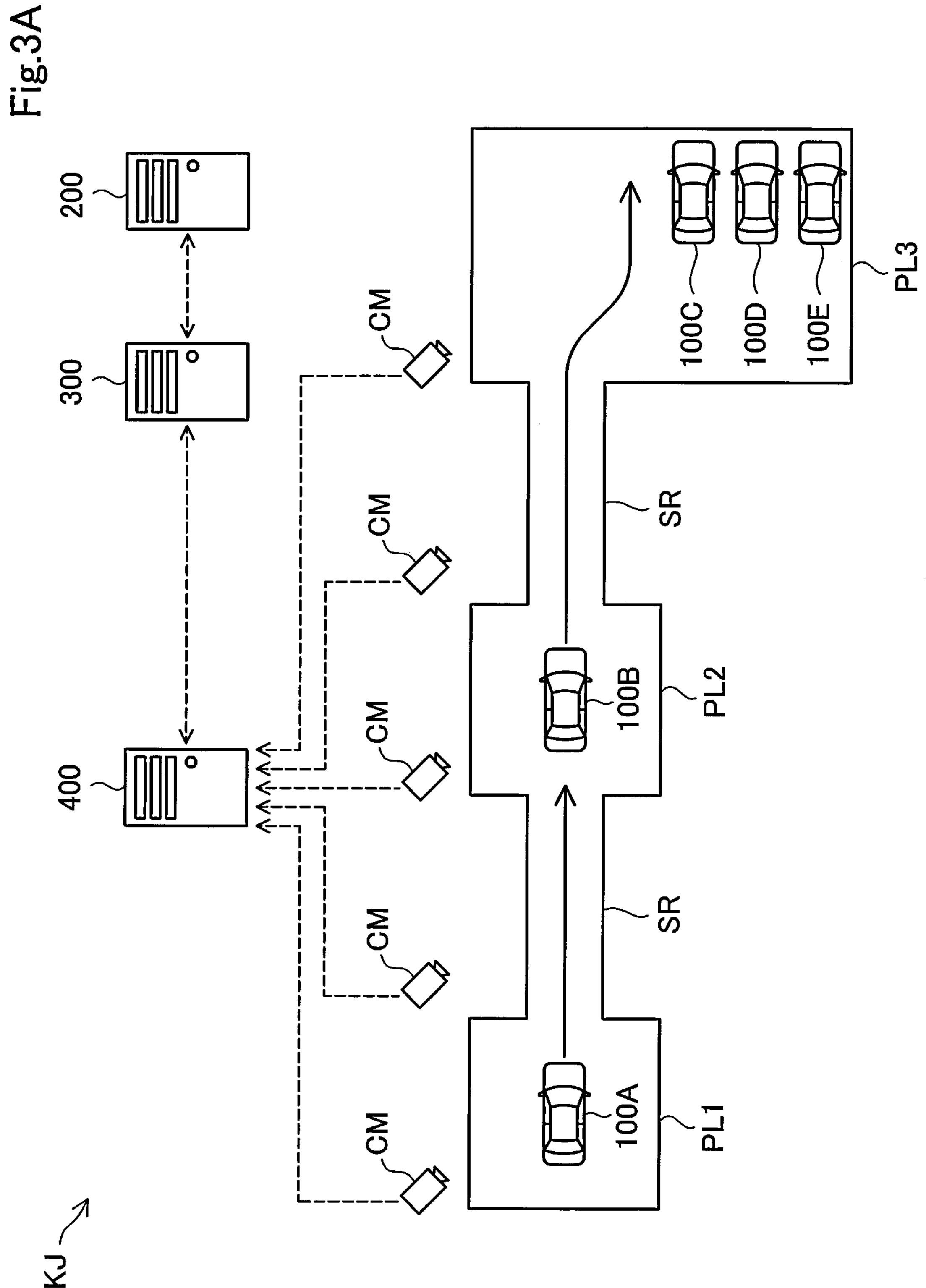
FIG. 3A is an explanatory view illustrating how the vehicle is moved by remote control in a factory.

FIG. 3A is an explanatory view illustrating how the vehicle 100 is moved by remote control in a factory KJ. FIG. 3A illustrates five vehicles 100A to 100E. In the following description, in a case where the five vehicles 100A to 100E will be described without being distinguished in particular, the vehicles 100A to 100E will be referred to simply as the vehicles 100. In the present embodiment, the factory KJ includes a first place PL1 for assembling the vehicles 100, a second place PL2 for inspecting the vehicles 100, and a third place PL3 for storing the vehicles 100 that have passed the inspection. The first place PL1, the second place PL2, and the third place PL3 are connected by a track SR on which the vehicles 100 can run. The vehicle 100 assembled in the first place PL1 is attached with the vehicle control device 110, the actuator group 120, and the communication device 130. The vehicle 100 assembled in the first place PL1 is remotely controlled by the remote control device 400, and runs from the first place PL1 to the second place PL2. The vehicle 100 having passed the inspection in the second place PL2 is remotely controlled by the remote control device 400, and runs from the second place PL2 to the third place PL3. The vehicle 100 having arrived at the third place PL3 is shipped from the factory KJ thereafter. In the following description, a process of assembling the vehicle 100 in the first place PL1 will be referred to as an assembly process, a process of moving the vehicle 100 from the first place PL1 to the second place PL2 will be referred to as a first moving process, a process of inspecting the vehicle 100 in the second place PL2 will be referred to as an inspection process, and a process of moving the vehicle 100 from the second place PL2 to the third place PL3 is a second moving process. The assembly process, the first moving process, the inspection process, and the second moving process are included in the manufacturing process of the vehicle 100.

A method for moving the vehicle 100 by remote control by the remote control device 400 will be described. The remote control device 400 determines a target route for the vehicle 100 to run toward a destination through the track SR. A plurality of the cameras CM that shoot the track SR are installed in the factory KJ, and the remote control device 400 can acquire a relative position and direction of the vehicle 100 with respect to the target route in real time by analyzing a video shot by each camera CM. In the present embodiment, the target route refers to a reference route to be described later. The remote control device 400 generates the control signal SS for causing the vehicle 100 to run along the target route, and transmits the control signal SS to the vehicle 100. The control signal SS indicates, for example, a target value of an acceleration or a target value of a rudder angle of the vehicle 100. The vehicle control device 110 mounted on the vehicle 100 causes the vehicle 100 to run by controlling the actuator group 120 according to the received control signal SS. Consequently, it is possible to cause the vehicle 100 to move without using a conveyance device such as a crane or a conveyor. Note that the control signal SS for causing the vehicle 100 to run will be referred to as a running control signal in the following description.

FIG. 3B is a flowchart illustrating a process procedure of running control of the vehicle 100 in the first embodiment. Step S1 to step S4 are repeatedly executed by a processor of the remote control device 400, whereas step S5 to step S6 are repeatedly executed by the processor 111 of the vehicle control device 110. In the step S1, the remote control device 400 acquires vehicle location information of the vehicle 100 using detection results output from the external sensor, which is a sensor located outside the vehicle 100. The vehicle location information is position information that serves as the basis for generating running control signals. In the present embodiment, the vehicle location information includes the position and orientation of the vehicle 100 in the reference coordinate system of the factory KJ. In the present embodiment, the reference coordinate system of the factory KJ is the global coordinate system, and any location in the factory KJ is expressed with X, Y, and Z coordinates in the global coordinate system. In the present embodiment, the external sensor is the camera CM, and the external sensor outputs a captured image as a detection result. That is, in the step S1, the remote control device 400 acquires the vehicle location information using captured images acquired from the camera CM, which is the external sensor.

More specifically, in step S1, the remote control device 400 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the remote control disabling system 10 or outside the remote control disabling system 10. The detection model is stored in advance in a memory of the remote control device 400, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control device 400 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control device 400 determines a target location to which the vehicle 100 is to move next. In the present embodiment, the target location is expressed by X, Y, and Z coordinates in the global coordinate system. The memory of the remote control device 400 contains the reference route stored in advance as a route along which the vehicle 100 is to run. The route is expressed by a node indicating a departure place, a node indicating a way point, a node indicating a destination, and a link connecting nodes to each other. The remote control device 400 determines the target location to which the vehicle 100 is to move next using the vehicle location information and the reference route. The remote control device 400 determines the target location on the reference route ahead of a current location of the vehicle 100.

In step S3, the remote control device 400 generates a running control signal for causing the vehicle 100 to run toward the determined target location. In the present embodiment, the running control signal includes an acceleration and a steering angle of the vehicle 100 as parameters. The remote control device 400 calculates a running speed of the vehicle 100 from transition of the location of the vehicle 100 and makes comparison between the calculated running speed and a target speed of the vehicle 100 determined in advance. If the running speed is lower than the target speed, the remote control device 400 generally determines an acceleration in such a manner as to accelerate the vehicle 100. If the running speed is higher than the target speed as, the remote control device 400 generally determines an acceleration in such a manner as to decelerate the vehicle 100. If the vehicle 100 is on the reference route, The remote control device 400 determines a steering angle and an acceleration in such a manner as to prevent the vehicle 100 from deviating from the reference route. If the vehicle 100 is not on the reference route, in other words, if the vehicle 100 deviates from the reference route, the remote control device 400 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control device 400 transmits the generated running control signal to the vehicle 100. The remote control device 400 repeats the acquisition of vehicle location information, the determination of a target location, the generation of a running control signal, the transmission of the running control signal, and others in a predetermined cycle.

In step S5, the vehicle control device 110 of the vehicle 100 receives the running control signal transmitted from the remote control device 400. In step S6, the vehicle control device 110 controls the actuator group 120 using the received running control signal, thereby causing the vehicle 100 to run at the acceleration and the steering angle indicated by the running control signal. The vehicle control device 110 repeats the reception of a running control signal and the control over the actuator group 120 in a predetermined cycle.

Figure 4:
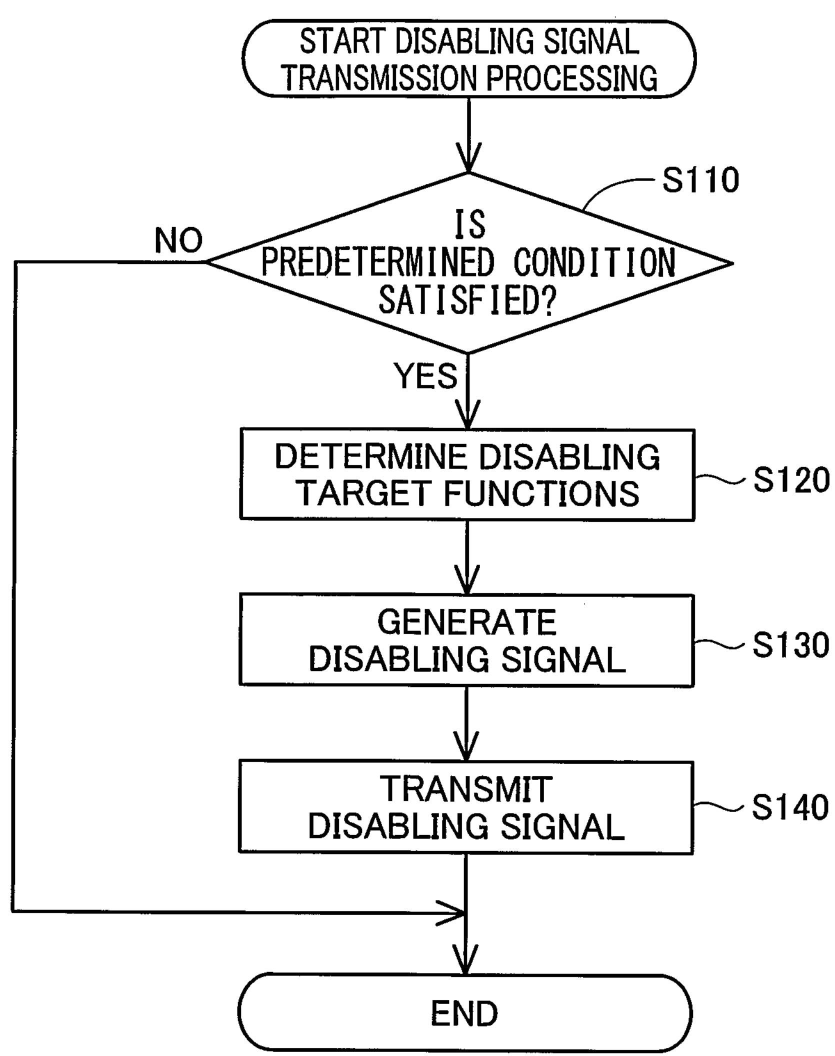
FIG. 4 is a flowchart illustrating contents of disabling signal transmission processing according to the first embodiment.
Figure 5:
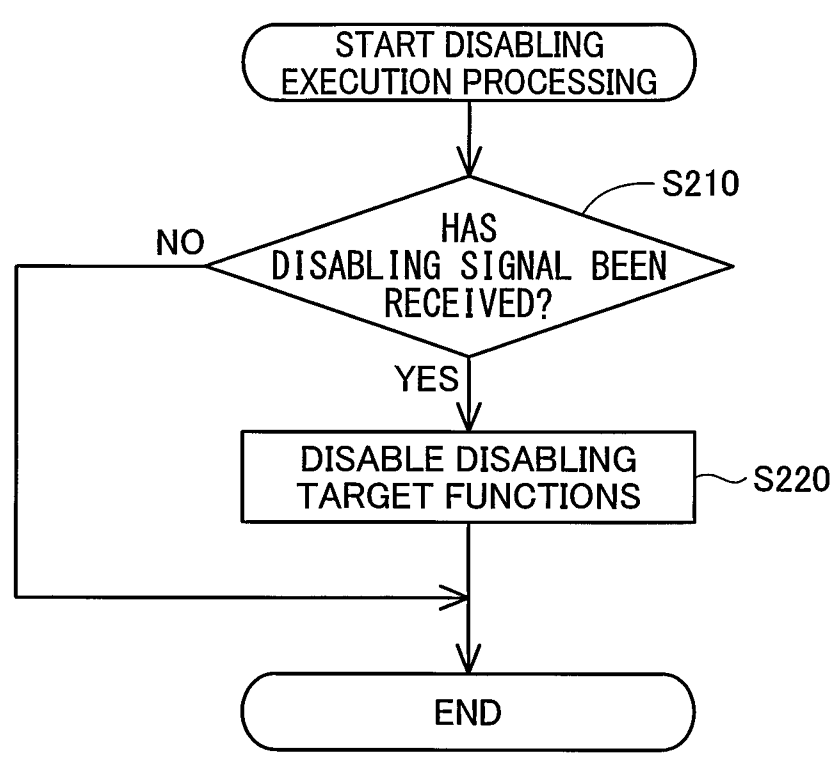
FIG. 5 is a flowchart illustrating contents of disabling execution processing according to the first embodiment.

FIG. 4 is a flowchart illustrating contents of disabling signal transmission processing executed by the remote control disabling device 200. FIG. 5 is a flowchart illustrating contents of disabling execution processing executed by the vehicle 100. FIG. 6 is an explanatory view illustrating how remote control of the vehicle 100 is disabled. A remote control disabling method executed by the remote control disabling system 10 will be described with reference to FIGS. 4 to 6.

The disabling signal transmission processing illustrated in FIG. 4 is repeatedly executed by the remote control disabling device 200. When the disabling signal transmission processing is started, the disabling target function determination unit 220 determines in step S110 whether or not a predetermined condition is satisfied. In the present embodiment, the predetermined condition is that the vehicle 100 has moved to the third place PL3 illustrated in FIG. 3A, in other words, the vehicle 100 is in a shipping standby state. The disabling target function determination unit 220 can determine whether or not the vehicle 100 is in the shipping standby state using the information related to the progress of the manufacturing process of the vehicle 100 acquired from the process management device 300 by the information acquisition unit 210. In a case where it is determined in step S110 that the predetermined condition is not satisfied, the remote control disabling device 200 skips processing after step S110, and finishes the disabling signal transmission processing.

In a case where it is determined in step S110 that the predetermined condition is satisfied, the disabling target function determination unit 220 determines target functions to disable among the plurality of remote control functions of the vehicle 100 in step S120. In the present embodiment, the progress of the manufacturing process of the vehicle 100 and the functions to disable are associated and stored in a database DB stored in advance in the memory 202. The disabling target function determination unit 220 determines the functions to disable referring to the database DB stored in the memory 202. In the present embodiment, the remote control functions to be disabled include a function of changing the state of the vehicle 100 from "Ready-OFF" to "Ready-ON" by remote control, a function of changing the shift position of the vehicle 100 from a "P" (Parking) range to a "D" (Drive) range, and a function of changing the shift position of the vehicle 100 from the "P" range to a "R" (Rear) range.

In step S130, the disabling signal generation unit 230 generates the disabling signal MS for disabling the functions determined by the disabling target function determination unit 220. In step S140, the disabling signal transmission unit 240 transmits to the vehicle 100 the disabling signal MS generated by the disabling signal generation unit 230. Then, the remote control disabling device 200 finishes the disabling signal transmission processing.

The disabling execution processing illustrated in FIG. 5 is repeatedly executed by the disabling execution unit 117 of the vehicle 100. When the disabling execution processing is started, the disabling execution unit 117 determines in step S210 whether or not the disabling signal MS has been received. In a case where it is determined in step S210 that the disabling signal MS has not been received, the disabling execution unit 117 skips processing after step S210, and finishes the disabling execution processing. In a case where it is determined in step S210 that the disabling signal MS has been received, the disabling execution unit 117 disables part of the remote control functions according to the disabling signal MS in step S220. Then, the disabling execution unit 117 finishes the disabling execution processing.

As illustrated in FIG. 6, when the vehicle 100 is placed in the shipping standby state by the disabling signal transmission processing, the disabling signal MS is transmitted from the remote control disabling device 200 to the vehicle 100. The disabling execution processing disables part of the remote control functions in the vehicle 100 that has received the disabling signal MS. Then, the vehicle 100 whose part of the remote control functions are disabled is shipped.

The remote control disabling system 10 according to the above-described present embodiment can disable part of the plurality of remote control functions instead of all of the plurality of remote control functions of the vehicle 100. Consequently, it is possible to prevent all of the remote control functions from being disabled and deteriorating user-friendliness.

Furthermore, in the present embodiment, in a case where the vehicle 100 is in the shipping standby state from the factory KJ, the function of changing the state of the vehicle 100 from "Ready-OFF" to "Ready-ON" by remote control, the function of changing the shift position of the vehicle 100 from the "P" (Parking) range to the "D" (Drive) range, and the function of changing the shift position of the vehicle 100 from the "P" range to the "R" (Rear) range are disabled. Consequently, it is possible to prevent the third party from changing the state of the vehicle 100 from "Ready-OFF" to "Ready-ON" by remote control, and prevent the third party from changing the shift position of the vehicle 100 from the "P" range to the "D" range or the "R" range by remote control after shipping.

B. Second Embodiment

Figure 7:
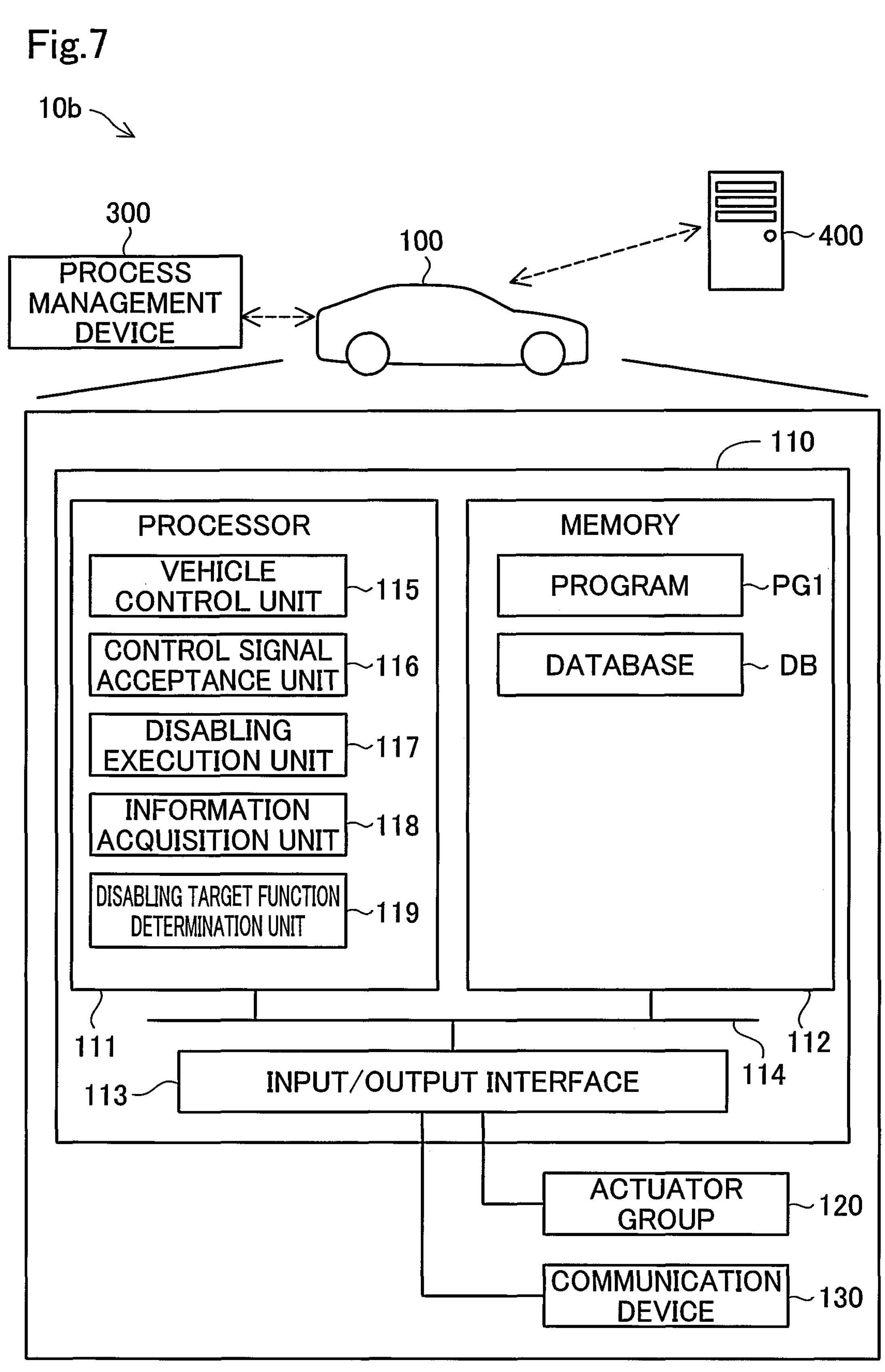
FIG. 7 is an explanatory view illustrating a configuration of the remote control disabling system according to a second embodiment.

FIG. 7 is an explanatory view illustrating a configuration of a remote control disabling system 10*b* according to a second embodiment. The present embodiment differs from the first embodiment in that the remote control disabling system 10*b* does not include the remote control disabling device 200, and the vehicle 100 disables part of the remote control functions irrespectively of a disabling signal when the predetermined condition is satisfied. The other components are the same as those in the first embodiment unless otherwise specified.

In the present embodiment, the processor 111 of the vehicle control device 110 functions as the vehicle control unit 115, the control signal acceptance unit 116, the disabling execution unit 117, the information acquisition unit 118, and the disabling target function determination unit 119 by executing the computer program PG1 stored in advance in the memory 112. The information acquisition unit 118 acquires the information related to the progress of the manufacturing process of the vehicle 100 from the process management device 300. The disabling target function determination unit 119 determines target functions to disable among the plurality of remote control functions using the information acquired by the information acquisition unit 118. The database DB is stored in advance in the memory

112. The progress of the manufacturing process of the vehicle 100 and the functions to disable are associated and stored in the database DB. Note that the disabling target function determination unit 119 will be referred to simply as the determination unit, and the disabling execution unit 117 will be referred to simply as an execution unit.

Figure 8:
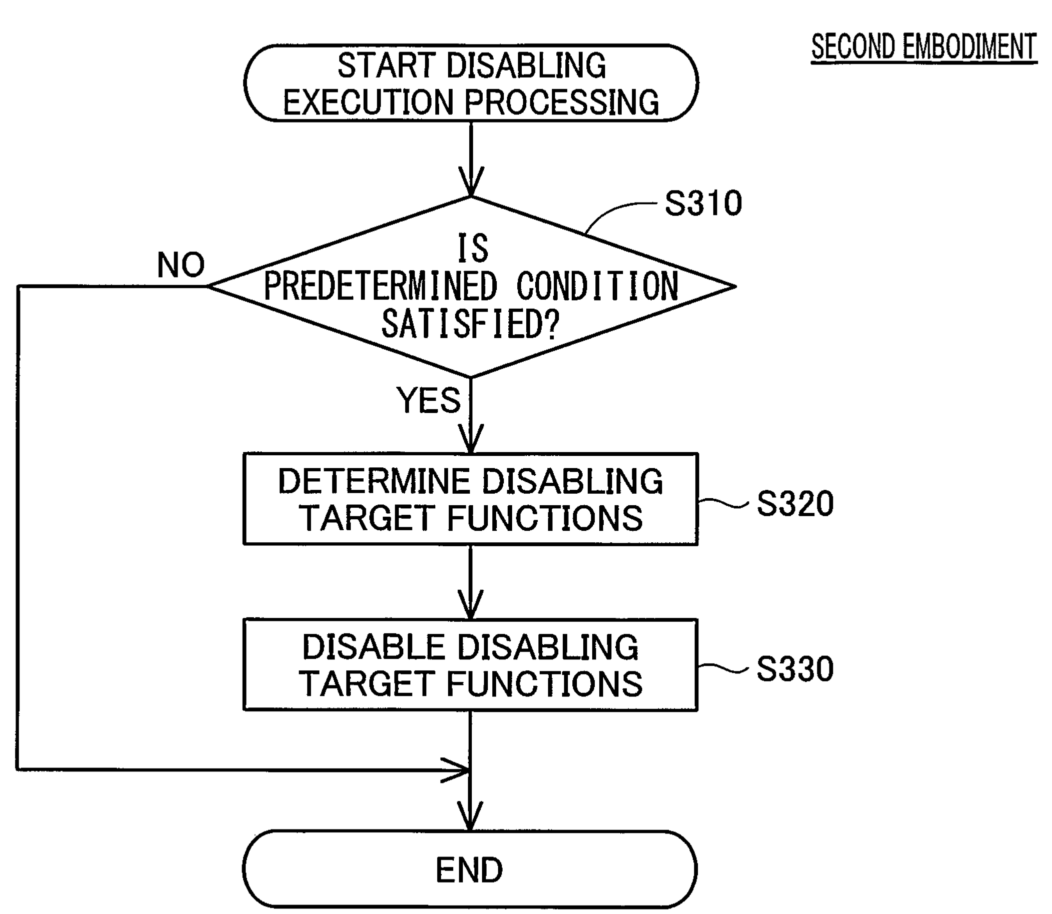
FIG. 8 is a flowchart illustrating contents of the disabling execution processing according to the second embodiment.
Figure 9:
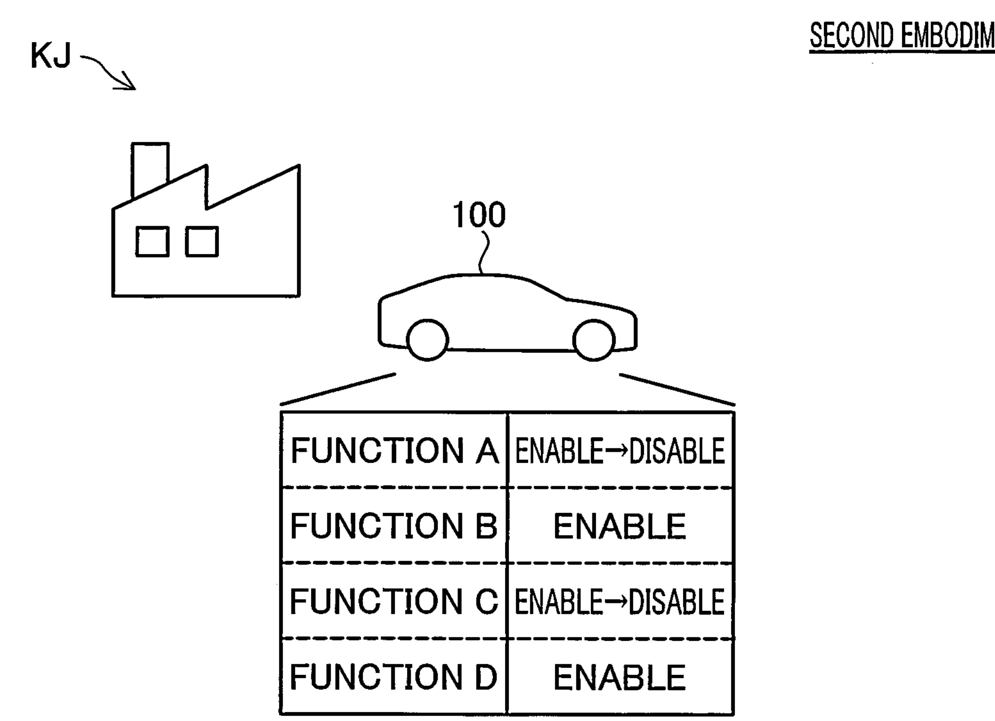
FIG. 9 is an explanatory view illustrating how part of the remote control functions of the vehicle are disabled.

FIG. 8 is a flowchart illustrating contents of disabling signal transmission executed by the remote control disabling system 10*b* according to the second embodiment. FIG. 9 is an explanatory view illustrating how remote control of the vehicle 100 is disabled. A remote control disabling method performed by the remote control disabling system 10*b* will be described with reference to FIGS. 8 and 9.

When the disabling execution processing illustrated in FIG. 8 is started, the disabling target function determination unit 119 determines in step S310 whether or not the predetermined condition is satisfied. The predetermined condition is that the vehicle 100 is in the shipping standby state similar to the first embodiment. The disabling target function determination unit 119 can determine whether or not the vehicle 100 is in the shipping standby state using the information related to the progress of the manufacturing process of the vehicle 100 acquired from the process management device 300 by the information acquisition unit 118. In a case where it is determined in step S310 that the predetermined condition is not satisfied, the disabling target function determination unit 119 skips processing after step S110, and finishes the disabling execution processing.

In a case where it is determined in step S310 that the predetermined condition is satisfied, the disabling target function determination unit 119 determines target functions to disable among the plurality of remote control functions of the vehicle 100 in step S320. The disabling target function determination unit 119 determines the functions to disable referring to the database DB stored in advance in the memory 112. In step S330, the disabling execution unit 117 disables the functions determined by the disabling target function determination unit 119. Then, the disabling execution unit 117 finishes the disabling execution processing.

As illustrated in FIG. 9, when the vehicle 100 is placed in the shipping standby state by the disabling execution processing, part of the remote control functions of the vehicle 100 are disabled. Then, the vehicle 100 whose part of the remote control functions are disabled is shipped.

The remote control disabling system 10*b* according to the above-described present embodiment can disable part of the plurality of remote control functions instead of all of the plurality of remote control functions of the vehicle 100. Consequently, it is possible to prevent all of the remote control functions from being disabled and deteriorating user-friendliness.

C. Other Embodiment (C1) In the remote control disabling systems 10 to 10*b* according to each of the above-described embodiments, part of the remote control functions of the vehicle 100 are disabled when the vehicle 100 finishes moving to the third place PL3. By contrast with this, in the remote control disabling systems 10 to 10*b*, part of the remote control functions of the vehicle 100 may be disabled when the vehicle 100 finishes moving to the second place PL2. Part of the remote control functions of the vehicle 100 may be disabled when inspection of the vehicle 100 at the second place PL2 is finished.

(C2) In the remote control disabling systems 10 to 10*b*, part of the remote control functions of the vehicle 100 may be disabled when the vehicle 100 finishes moving to the second place PL2, and, moreover, part of the rest of the remote control functions of the vehicle 100 may be disabled when the vehicle 100 finishes moving to the third place PL3. In this case, a condition that the vehicle 100 has finished moving to the second place PL2 will be also referred to as a first condition, and a condition that the vehicle 100 has finished moving to the third place PL3 will be also referred to as a second condition. In the remote control disabling systems 10 to 10*b*, part of the remote control functions of the vehicle 100 may be disabled when the vehicle 100 finishes moving to the second place PL2, and, moreover, part of the rest of remote control functions of the vehicle 100 may be disabled when inspection of the vehicle 100 at the second place PL2 is finished. In this case, a condition that the vehicle 100 has finished moving to the second place PL2 will be also referred to as a first condition, and a condition that inspection of the vehicle 100 at the second place PL2 has been finished will be also referred to as a second condition. Note that a remote control function that is disabled when the first condition is satisfied will be also referred to as a first function, and a remote control function that is disabled when the second condition is satisfied will be also referred to as a second function.

(C3) In the remote control disabling systems 10 to 10*b* according to each of the above-described embodiments, the disabling execution unit 117 irreversibly disables the remote control functions. By contrast with this, in the remote control disabling systems 10 to 10*b*, the disabling execution unit 117 may reversibly disable the remote control functions. In this case, the disabling execution unit 117 may enable the reversibly disabled remote control functions. For example, in the remote control disabling system 10 according to the first embodiment, a disabling target function determination unit 220 may determine target functions to enable among reversibly disabled remote control functions when the predetermined condition is satisfied, a disabling signal generation unit 230 may generate an enable signal for enabling the remote control functions determined by the disabling target function determination unit 220, and a disabling signal transmission unit 240 may transmit to the vehicle 100 the enable signal generated by the disabling signal generation unit 230. When receiving the enable signal, the disabling execution unit 117 of the vehicle 100 may enable the reversibly disabled remote control functions.

(C4) In the remote control disabling systems 10 to 10*b* according to each of the above-described embodiments, the vehicle 100 may include a GPS receiver, and part of the remote control functions may be switched between the enabled state and the disabled state according to position information of the vehicle 100 acquired by the GPS receiver. When an abnormality of the vehicle 100 is detected by a self-diagnosis function of the vehicle 100, part of the remote control functions may be switched between the enabled state and the disabled state. When a communication state between the vehicle 100 and the remote control device 400 deteriorates, part of the remote control functions may be switched between the enabled state and the disabled state. When it is detected that a remote control device that is not registered and the vehicle 100 are communicating, part of the remote control functions may be switched between the enabled state and the disabled state. When a poor health condition of the driver who is driving the vehicle 100 is detected, part of the remote control functions may be switched from the disabled state to the enabled state, and stop the vehicle 100 by remote control. By, for example, measuring the heart rate of the driver by a wearable terminal attached to the driver, and measuring the amount of sweat of the driver by a sensor provided to a steering of the vehicle 100, it is possible to detect the poor health condition of the driver.

(C5) In the remote control disabling system 10 according to the above-described first embodiment, the remote control disabling device 200 may be integrated with the process management device 300. The remote control disabling device 200 may be integrated with the remote control device 400. The remote control disabling device 200 may be integrated with the process management device 300 and the remote control device 400.

(C6) In the remote control disabling system **10*b* according to the above-described second embodiment, the disabling target function determination unit 119 of the vehicle 100 may acquire information indicating disabling target functions by determining the disabling target functions using the information acquired by the information acquisition unit 118. By contrast with this, in the remote control disabling system 10*b* according to the second embodiment, the vehicle 100 may not be provided with the disabling target function determination unit 119. In this case, the information acquisition unit 118 may acquire, for example, the information indicating the disabling target functions from the process management device 300, and the disabling execution unit 117 may disable the functions indicated by the information acquired by the information acquisition unit 118. Note that the disabling target function determination unit 119 will be also referred to as an acquisition unit in a case where the vehicle 100 is provided with the disabling target function determination unit 119, and the information acquisition unit 118 will be referred to as an acquisition unit in a case where the vehicle 100 is not provided with the disabling target function determination unit 119**.

(C7) In the remote control disabling systems 10 to **10*b* of the respective embodiments described above, the external sensor is not limited to the camera CM but may be the distance measuring device, for example. The distance measuring device is a light detection and ranging (LiDAR) device, for example. In this case, detection result output from the external sensor may be three-dimensional point cloud data representing the vehicle 100. The remote control device 400 and the vehicle 100** may acquire the vehicle location information through template matching using the three-dimensional point cloud data as the detection result and reference point cloud data, for example.

(C8) In the remote control disabling systems 10 to **10*b* of the respective embodiments described above, the remote control device 400 performs the processing from acquisition of vehicle location information to generation of a running control signal. By contrast, the vehicle 100** may perform at least part of the processing from acquisition of vehicle location information to generation of a running control signal. For example, embodiments (1) to (3) described below are applicable, for example.

(1) The remote control device 400 may acquire vehicle location information, determine a target location to which the vehicle 100 is to move next, and generate a route from a current location of the vehicle 100 indicated by the acquired vehicle location information to the target location. The remote control device 400 may generate a route to the target location between the current location and a destination or generate a route to the destination. The remote control device 400 may transmit the generated route to the vehicle 100. The vehicle 100 may generate a running control signal in such a manner as to cause the vehicle 100 to run along the route received from the remote control device 400 and control the actuator group 120 using the generated running control signal.

(2) The remote control device 400 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the actuator group 120 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 400 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C9) In the remote control disabling systems 10 to **10*b* of the respective embodiments described above, the remote control device 400 automatically generates a running control signal to be transmitted to the vehicle 100. By contrast, the remote control device 400 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the remote control device 400 through wire communication or wireless communication, for example, and the remote control device 400** may generate a running control signal responsive to the operation on the operating device.

(C10) In each of the above-described embodiments, the vehicle 100 is simply required to have a configuration to become movable by unmanned driving. The vehicle 100 may embodied as a platform having the following configuration, for example. The vehicle 100 is simply required to include at least the vehicle control device 110 and the actuator group 120 in order to fulfill three functions including “run,” “turn,” and “stop” by unmanned driving. In order for the vehicle 100 to acquire information from outside for unmanned driving, the vehicle 100 is simply required to include the communication device 130 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C11) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C12) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(C13) The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A remote control disabling device comprising:
a processor;
a memory storing a program executed by the processor; and
a communication device configured to communicate with a moving object by wireless communication, wherein the moving object is remotely controlled in a factory that manufactures the moving object,
wherein the processor, by executing the program, is configured to:
acquire information indicating a progress of a manufacturing process of the moving object,
one or more target functions among a plurality of functions performed by the moving object using the information that was acquired, wherein (i) each of the plurality of functions is a function executed by remotely controlling the moving object, (ii) each of the plurality of functions can be switched from an enabled state to a disabled state, and (iii) the target functions are less than all of the plurality of functions, and
transmit a disabling signal to the moving object using the communication device, wherein the disabling signal is a signal that causes the target functions to switch from the enabled state to the disabled state.

2. The remote control disabling device according to claim 1, wherein
the moving object is a vehicle, and
the processor is configured to, when the moving object is in a shipping standby state from the factory, transmit the disabling signal to the moving object using the communication device, wherein the disabling signal causes a function of changing a shift position of the moving object to switch from the enabled state to the disabled state.

3. The remote control disabling device according to claim 1, wherein
the one or more target functions include a function of accelerating the moving object and a function of decelerating the moving object.

4. The remote control disabling device according to claim 1, wherein
the one or more target functions include a function of changing a traveling direction of the moving object.

5. The remote control disabling device according to claim 1, wherein
the one or more target functions include a function of moving at over a predetermined speed.

6. The remote control disabling device according to claim 1, wherein the plurality of functions include a first function and a second function different from the first function, and the processor is configured to determine the first function as the one or more target functions when a predetermined first condition is satisfied, and determine the second function as the one or more target functions when a predetermined second condition different from the predetermined first condition is satisfied, the predetermined second condition being satisfied after the predetermined first condition is satisfied so that the first function is switched from the enabled state to the disabled state before the second function is switched from the enabled state to the disabled state.

7. The remote control disabling device according to claim 1, wherein the disabling signal causes the target functions to irreversibly switch from the enabled state to the disabled state.

8. The remote control disabling device according to claim 7, wherein the disabling signal causes the target functions to irreversibly switch from the enabled state to the disabled state by deleting a portion of the program stored in a memory of the moving object and related to the target functions to be deleted from the memory of the moving object.

9. A moving object operable by remote control, the moving object comprising:

a processor; and a memory storing a program executed by the processor, wherein the processor, by executing the program, is configured to:

acquire information indicating a progress of a manufacturing process of the moving object, wherein the moving object is remotely controlled in a factory that manufactures the moving object, determine one or more target functions among a plurality of functions performed by the moving object using the information that was acquired, wherein (i) each of the plurality of functions is a function executed by remotely controlling the moving object, (ii) each of the plurality of functions can be switched from an enabled state to a disabled state, and (iii) the target functions are less than all of the plurality of functions, and switch the target functions from the enabled state to the disabled state.

10. The moving object according to claim 9, wherein the disabling signal causes the target functions to irreversibly switch from the enabled state to the disabled state.

11. The moving object according to claim 10, wherein the disabling signal causes the target functions to irreversibly switch from the enabled state to the disabled state by deleting a portion of the program stored in the memory and related to the target functions to be deleted from the memory.

12. A remote control disabling method comprising:

acquiring information indicating a progress of a manufacturing process of a moving object, wherein the moving object is remotely controlled in a factory that manufactures the moving object;

determining one or more target functions among a plurality of functions performed by the moving object using the information that was acquired, wherein (i) each of the plurality of functions is a function executed by remotely controlling the moving object, (ii) each of the plurality of functions can be switched from an enabled state to a disabled state, and (iii) the target functions are less than all of the plurality of functions; and causing the moving object to switch the target functions from the enabled state to the disabled state.

13. The remote control disabling method according to claim 12, wherein the disabling signal causes the target functions to irreversibly switch from the enabled state to the disabled state.

14. The remote control disabling method according to claim 13, wherein the disabling signal causes the target functions to irreversibly switch from the enabled state to the disabled state by deleting a portion of a program stored in a memory of the moving object and related to the target functions to be deleted from the memory of the moving object.

* * * * *